Figure 1:
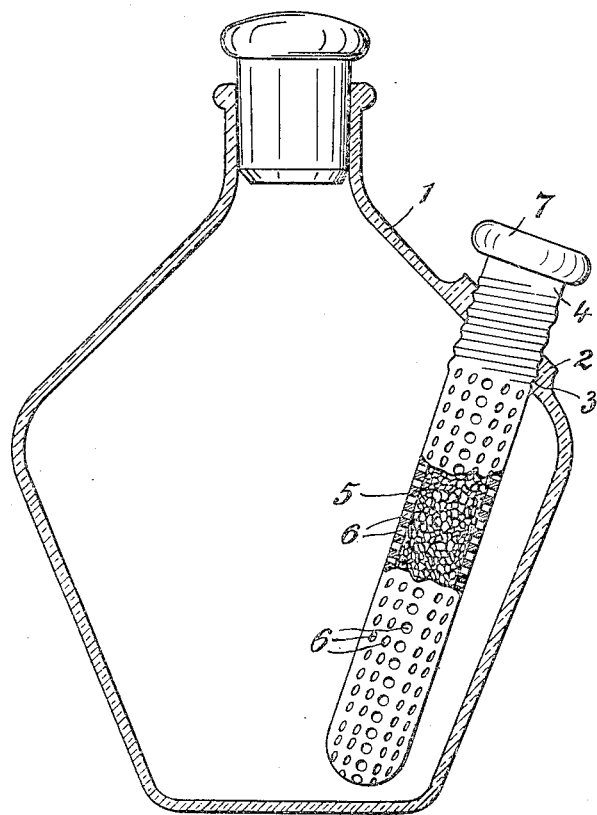

Oct. 25, 1932.  G. A. KRAUSE  1,883,967
STERILIZING CONTAINER FOR LIQUIDS
Filed May 9, 1929

Inventor:
Georg Alexander Krause
by
Atty.

Patented Oct. 25, 1932

1,883,967

UNITED STATES PATENT OFFICE

GEORG A. KRAUSE, OF MUNICH, GERMANY, ASSIGNOR TO KATADYN, INC., OF DOVER, DELAWARE, A CORPORATION OF DELAWARE

STERILIZING CONTAINER FOR LIQUIDS

Application filed May 9, 1929, Serial No. 361,705, and in Germany May 12, 1928.

This invention relates to a sterilizing container for liquids and consists in providing the container with interchangeable devices, which are in connection with the container and which are oligo-dynamically active or contain oligo-dynamically active substances.

Thus, for example, individual parts of the container itself, such as the bottom, may be made interchangeable and may be provided with oligo-dynamically active metals or metal compounds, for example by being coated therewith. A prefererd embodiment of the invention consists, for example, in employing thimbles filled or partially filled with an oligo-dynamically active substance or consisting of an oligo-dynamically active metal or lined with aligo-dynamically active substances, which thimbles are interchangeably introduced into the container. A particularly advantageous embodiment of the invention is one in which the said thimbles are interchangeably screwed into the walls of the container or are interchangeably disposed in the stopper or closure member of the container.

It has already been proposed to prepare sterilizing containers by depositing silver gel on the inner wall of a porous container. Containers of this kind, however, are attended with considerable drawbacks, such as the poor adhesion of the silver gel deposit on the walls of the container, in consequence of which the deposit easily becomes detached from the walls of the container when the latter is employed for purposes of sterilization. The silver gel in this case not only pollutes the liquid, for example water, undergoing sterilization, but is lost so that the container no longer has a sterilizing action. It is scarcely possible, in this case, to secure an effective connection between the inner wall of the container and the oligo-dynamically active substances, so that losses in oligo-dynamically active substances are incurred and the container becomes useless. A further drawback in the known sterilizing containers, lies in the fact that the porous substance employed for the water bottles, absorbs the silver gel and frequently blackens on the outside as soon as the silver comes into contact with the sulphuretted hydrogen in the air. The containers, therefore, in a short time, acquire an unpleasing appearance.

All these drawbacks are overcome according to the invention by disposing the oligo-dynamically active substances on or within interchangeable parts, which are in connection with the container. These parts may also be metalized in any desired manner. They can, moreover, be easily cleaned, or if desired, replaced.

The invention is hereinafter described with reference to the accompanying diagrammatic drawing in which:—

Figure 2:
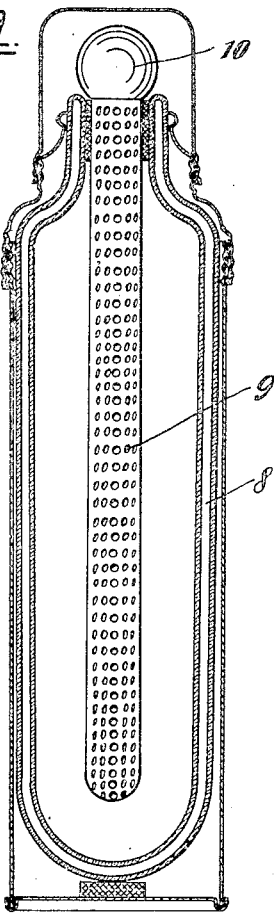
Figure 3:
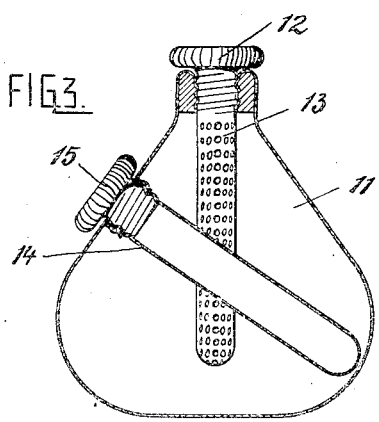

Figure 1 is a cross section partly in elevation illustrating one construction according to the invention Figure 2 is a similar view illustrating a modification Figure 3 is a similar view illustrating a further modification.

Figure 1 represents a water bottle, preferably of porous ceramic material, which is provided in the wall 1 with a socket 2 provided with a thread 3. Into this threaded socket a thimble 4 is introduced, which preferably extends to the bottom of the bottle and also consists of porous material. The thimble 4 is hollow inside and filled with an oligo-dynamically active substance 5, which is accessible to the liquid in the container by means of openings 6 in the thimble. The thimble head or cap 7 may be removable so as to enable the oligo-dynamically active substance 5 in the thimble to be removed, for example for purposes of cleaning or changing. In place of porous material the thimble may itself also consist of oligo-dynamically active material or be provided with a coating of oligo-dynamically active substance.

Figure 2 represents a modification of the invention in the form of a Dewar container or thermos flask 8 in which the thimble 9, which is similar in construction to the thimble 4, is disposed in the stopper 10.

Figure 3 represents a field flask 11 provided with a screwed closure member 12. A sterilizing element 13, for example in the form of a thimble is connected, preferably inter-changeably, with the screwed closure member 12. A thimble-like tube 14, closed at its bottom end, also projects into the field flask and is permanently connected therewith. This tube serves for the reception of the screwed closure member 12 and sterilizer 13, when the latter is not in use. When the sterilizer 13 is in the tube 14 the field flask is secured against the loss of liquid by means of the ordinary field flask stopper 15, which is screwed into the storage tube 14 when the sterilizing member 13 is in use.

I claim:

1. In a sterilizing apparatus of the class described a closed container having walls, an oligodynamically active sterilizing element adapted to be projected through the walls, means to detachably secure said sterilizing element to said walls in liquid tight relation thereto, and means to introduce liquid into said container to contact with said sterilizing device, and means to support said sterilizing device in said container and out of contact with said liquid whereby said sterilizing device may be revived.

2. A sterilizing apparatus as claimed in claim 1 in which the sterilizing element is an elongated tubular element coated with an oligodynamically active element.

In testimony whereof I affix my signature.

GEORG A. KRAUSE.